United States Patent [19]
Fiala

[11] 3,804,430

[45] Apr. 16, 1974

[54] SAFETY BELT TENSIONING ARRANGEMENT

[75] Inventor: Ernst Fiala, Margaretenhoehe, Austria

[73] Assignee: Volkswagenwerk Aktiengesellschaft, Wolfsburg, Germany

[22] Filed: Apr. 7, 1972

[21] Appl. No.: 242,152

[30] Foreign Application Priority Data
Apr. 24, 1971 Germany............................ 2120172

[52] U.S. Cl............................................ 280/150 SB
[51] Int. Cl................................................. B60r 21/10
[58] Field of Search..... 280/150 SB, 150 B; 180/91, 180/82

[56] References Cited
UNITED STATES PATENTS
| | | | |
|---|---|---|---|
| 3,633,936 | 1/1972 | Huber | 280/150 B |
| 3,022,089 | 2/1962 | Botar | 280/150 SB |
| 3,695,629 | 10/1972 | Schlanger | 180/91 |

FOREIGN PATENTS OR APPLICATIONS
| | | | |
|---|---|---|---|
| 539,705 | 7/1955 | Belgium | 280/150 B |
| 802,321 | 10/1958 | Great Britain | 280/150 B |

*Primary Examiner*—Robert R. Song
*Attorney, Agent, or Firm*—Brumbaugh, Graves, Donohue & Raymond

[57] ABSTRACT

An improved safety belt that allows the occupant of a vehicle freedom of movement during normal driving conditions, but holds the occupant securely in position when a collision occurs. The improvement resides in the combination of a biased pivotal lever, one end of which is releasably coupled to the safety belt, and a displaceable piston adapted to respond to contact pressure resulting from a collision to rotate the lever away from the passenger and thereby tension the safety belt around the passenger. Further provided is a mechanism for causing the release of the safety belt from the lever when the biasing exerted on the lever returns the lever to its normal pre-collision position.

16 Claims, 8 Drawing Figures

PATENTED APR 16 1974 3,804,430

SAFETY BELT TENSIONING ARRANGEMENT

BACKGROUND OF THE INVENTION

This invention relates to safety belts for passenger cars and, in particular, to a new and improved safety belt arrangement that permits the occupant to fit the safety belt loosely around him during normal driving conditions, but that automatically tightens the safety belt around the occupant in the event of a collision.

As is well recognized, properly worn safety belts have contributed greatly in reducing the number of highway fatalities and serious injuries. Since the purpose of safety belts is to retard the movement of the body relative to the vehicle during rapid deceleration, safety belts are most effective when they securely hold the passenger in the seat. The problem, however, is that a tightly fitting safety belt tends to be uncomfortable with the result that occupants of vehicles either do not use them at all or wear them loosely. While in the latter case some effectiveness is provided, there is still a chance of the occupant's striking a hard object, such as the steering wheel, dashboard or windshield.

Safety devices have been developed with the specific purpose of protecting the head of the occupant. German Pat. No. 870,071, for example, describes a resilient cushion normally positioned above the occupant's head at a distance between the windshield and the passenger that falls down prior to a collision to protect the passenger from striking the windshield. The disadvantage of this safety device, as with the loosely fitting safety belt, is that the occupant may still travel far enough to be injured seriously.

SUMMARY OF THE INVENTION

There is provided, in accordance with the present invention, an improvement in a safety belt arrangement that overcomes the problems mentioned previously by allowing the safety belt to be worn loosely during normal driving conditions, but by causing the safety belt to tighten and thereby hold the occupant securely at the time of collision. More particularly, the invention involves an improvement in a safety belt apparatus in which the belt is tightened around the passenger upon collision. After the collision, the safety belt is automatically released to allow the occupant to exit the vehicle.

In safety belts of the type with which the invention is concerned, the belt is securely fastened at one end to the vehicle frame while the other end is attached to a tensioning device generally positioned behind the occupant. A collision sensor is positioned on an external portion of the vehicle, preferably on the front bumper. When a collision occurs, the sensor detects the pressure first and activates a piston within a fluid containing cylinder to transmit the fluid under pressure through a conduit. Another piston within a fluid containing cylinder responds to the pressure to rotate a spring biased lever. The lever is coupled at one end via a displaceable hook to the safety belt. Rotation of the lever causes the safety belt to be pulled away from the wearer to thereby tension the safety belt around the wearer.

The maximum tension is limited by a pressure exit for the fluid in the second cylinder which is coupled to a throttling device. After impact, the tensioning lever rotates back beyond and then to its original position because of the biasing exerted there against. During its backward movement, the safety belt is automatically released by a pick-off lever operating in conjunction with at least one cam.

The improved safety belt comprising the present invention may be used as either a knee belt, a body belt or a head harness. Preferably, all three are used together to provide maximum protection. When the safety belts are used to protect the knees and body, it is desirable to have them surround the front portion of the wearer but spaced from the wearer a distance so as not to impede free movement during normal driving conditions. In such arrangements, the end of the safety belt that is attached to the tensioning device is positioned preferably to the rear and to the side of the wearer and mounted on the interior of the vehicle. The belt is held away from the occupant by a spring, with the other end of the belt attached to the door of the vehicle. To provide unobstructed use of the door, the safety belt is attached to a lever that moves when the door is opened.

When the safety belt is used as a head harness, a transparent or net like pivotal harness is normally positioned away from the occupant and secured to the roof of the vehicle. The harness is connected to the roof such that the tensioning device pulls the harness down in front of the head of the occupant when a collision occurs. The head harness may be positioned above the sun visor during normal driving conditions.

DESCRIPTION OF THE PREFERRED EMBODIMENTS

Figure 1:
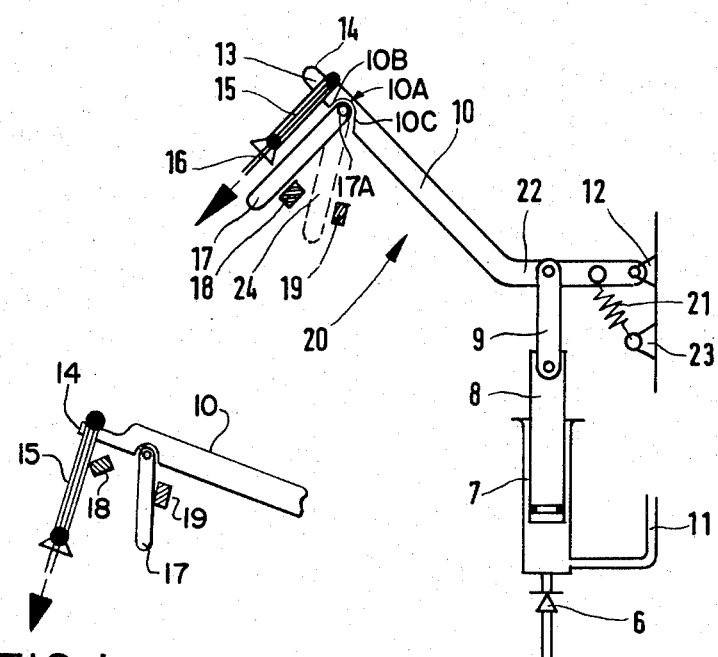
FIG. 1 is a schematic diagram of one embodiment of a tensioning device for safety belts arranged according to the present invention.

In the illustrative embodiment of a tensioning device arranged according to the present invention, as shown in FIG. 1, there is provided a collision sensor 1 that may be affixed to the front bumper of an automobile. Before any collision between the main body of the automobile and another object, such as another car or the like, the collision sensor 1 will first come in contact with the object and be driven backwardly toward the bumper of the car. The sensor 1 is coupled to a delivery piston 2 that is reciprocally mounted within a cylinder 3. The delivery cylinder 3 contains a suitably viscous fluid, such as oil, for transmitting pressure. Thus, the backward motion of the collision sensor 1 forces the delivery piston 2 further into the delivery cylinder 3 and thereby forces the fluid out of the delivery cylinder 3 and into a conduit 5. A pressure limiter 4, such as a spring operated valve, is affixed to the delivery cylinder 3 for allowing the fluid to flow therein when the pressure of the fluid is great enough. In this manner, the maximum pressure of the fluid may be set.

The conduit 5 passes the fluid from the delivery cylinder 3 to a tensioning cylinder 7 that is positioned in the vicinity of a safety belt in the interior of the vehicle. It will be understood that the conduit 5 may be coupled to several other tensioning devices (not shown) to activate the tensioning of all the safety belts in the vehicle. The coupling of the conduit 5 to a so called feeder conduit for such other devices is indicated by the arrow. Furthermore, by having more than one collision sensor and positioning each at a different location on the external surface of the vehicle, such as on the rear bumper or on the sides of the vehicle, it is then possible to have the safety belts tensioned in response to an impending collision coming from several possible directions.

Mounted within the conduit 5 are a pair of check valves 6 that permit the pressurized fluid to flow in only one direction toward the body of the car. The check valve closest to the delivery cylinder 3 prevents fluid from passing into the delivery cylinder 3. Without this check valve, fluid passing into the conduit 5, via the feeder conduit indicated by the arrow, due to the sensing of a collision from a different direction would buck the fluid flow in the delivery cylinder 3. In such event, the amount of pressure transmitted through the conduit 5 would decrease and adversely affect the tensioning of the safety belt. For a similar reason, the check valve 6 above the intersection of the conduit 5 prevents fluid from passing back into the conduit 5 from the tensioning cylinder 7.

Positioned within the tensioning cylinder 7 is a tensioning piston 8 that moves lengthwise within the cylinder in response to the pressure of the fluid extending into the tensioning cylinder 7. The upper end of the tensioning piston 8 is connected via a fixed arm 9 to a tensioning lever 10 at a point 22. A conduit 11 leads from the tensioning cylinder 7 to a throttling device (not shown) that performs a function to be described subsequently. The tensioning lever 10 is pivotally supported on one end by a bearing assembly 12 that is affixed to a part of the frame of the vehicle, indicated generally as a vertical line. Preferably, the lever arm 10 is positioned in back of the seat.

A recess 14 is formed within the free end of the tensioning lever 10 to receive a U or L shaped hook 15. The hook 15 is adapted to be connected to the tensioning or tightening end of a safety belt 16. Positioned to the right side of the hook 15 is an articulated pick-off lever 17 pivotally connected by a swivel mandrel 17A at its upper end to the tensioning lever 10 in a recess 10A provided in the level 10. A pick-off cam 18 and a cam 19 are arranged to the side of the positive direction of the lever 10 to act upon the lever 17 when in its active position. Arrow 20 shows the direction of the motion of the tensioning lever 10 when a collision occurs. Finally, the arrangement includes a biasing spring 21 which is connected between the shorter end of the tensioning lever 10 and a bearing assembly 23 that is affixed to the frame of the vehicle. The spring 21 limits the maximum movement of the tensioning lever 10 in the direction of the arrow 20.

The purpose of the structure shown in FIG. 1 is to provide tension to the safety belt just prior to a collision of the vehicle and, at some time after impact, to decrease the tension and release the safety belt. The latter action allows the occupant of the vehicle to exit the vehicle after the collision without having to manually release the safety belt. Thus, in operation, contact pressure exerted on the collision sensor 1 charges the delivery piston 2 into the delivery cylinder 3 and forces the fluid to pass under pressure into the conduit 5. In response to the pressurized fluid flowing there against, the tensioning piston 8 moves backwardly within the cylinder 7 to drive the tensioning lever 10 about the pivot point 12. Since the safety belt 16 is secured to the tensioning lever 10 through the hook 15, movement by the lever 10 away from the wearer causes the safety belt slack to be taken up and causes the occupant to be held firmly in the seat of the vehicle. The spring 21 which is stretched as the tensioning lever 10 is pivoted performs the function of limiting the tension so that the force exerted on the occupant is tolerable.

Other functions performed by the apparatus comprising the present invention are the reduction of tension to the safety belt and the release of it from the tensioning lever 10 after the collision is over. In particular, the throttling device 11 may be coupled to a reservoir or just open ended to provide a flow path for the fluid in the tensioning cylinder 7 during the tensioning of the safety belt 16 by the lever 10 to limit the rotational pressure exerted against the lever 10. Also, the rate of flow of the fluid and, therefore, the time required to cause the tensioning lever 10 to return to its original position depends on the strength of the spring 21 and the size of the diameter of the conduit comprising the throttling device 11. Those skilled in the art will be able to combine these factors such that the tension on the safety belt is not too great and, at the same time, will not begin to diminish until a certain time after the collision has occurred.

Figure 1C:
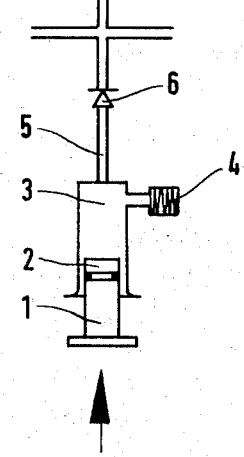
FIG. 1c is a schematic diagram showing the embodiment of FIG. 1 in a belt releasing position.

The lever 17 is free to pivot about the mandrel 17A to the extent allowed by the walls 10B and 10C of the recess 10A in lever 10. In the position shown in solid lines in FIG. 1, the lever 17 is prevented from clockwise rotation by the wall 10B. This prevents pick-off cam 18 from causing hook 15 to be pushed off recess 14 if lever 10 is moved in the opposite direction from arrow 20. However, once the tensioning device is activated and lever 10 has moved in direction 20, the lever 17 will rotate counterclockwise to the dotted position 24 after it has cleared cam 18, due to its own weight. The counterclockwise motion is stopped by wall 10C and/or cam 19. On the return motion of lever 10 under the influence of spring 21, the lever 10 will move in the direction opposite arrow 20, to a point beyond the position shown in FIG. 1. This extra motion is achieved because the fluid in cylinder 7 has been evacuated through conduit 11. At some point in the return motion of lever 10 (downward in FIG. 1) the area near the attachment of hook 15 will strike cam 18 and continued motion of lever 10 will allow cam 18 to push hook 15 off the recess 14 in lever 10, thereby releasing the safety belt as shown in FIG. 1C. To reset the apparatus hook 15 is returned to recess 14, and levers 10 and 17 are repositioned manually. With lever 17 once again in the position shown in FIG. 1, cam 17 cannot reach hook 15 to dislodge it.

Figure 1B:
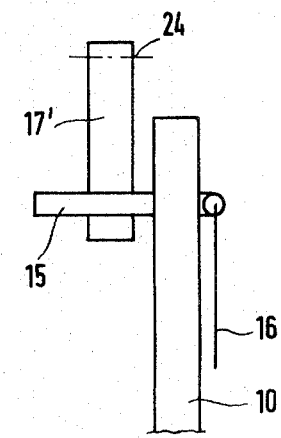
FIG. 1b is a side elevational view of the tensioning device shown in FIG. 1a looking in the direction of the arrows.
Figure 1A:
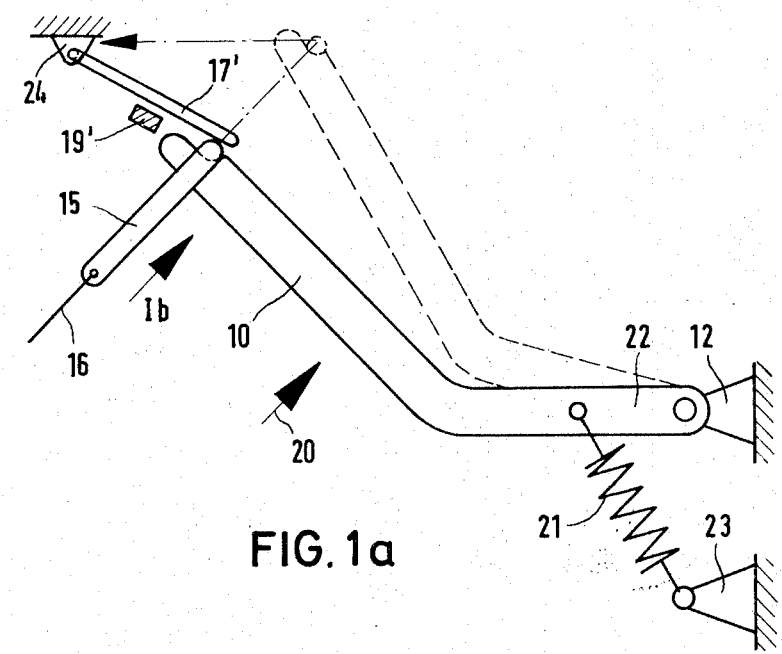
FIG. 1a is a schematic diagram of another embodiment of a tensioning device for safety belts arranged according to the present invention.

There is shown in FIGS. 1a and 1b an alternative embodiment for releasing the safety belt 16. At the initial position of the tensioning lever 10, the pick-off lever 17' rests on the top of the hook 15. As the tensioning lever 10 moves upward in the direction of the arrow 20 to the position shown in dotted lines, the pick-off lever 17' eventually falls away from the hook 15 and comes to rest on the top of the cam 19'. As the tensioning lever 10 travels back in the opposite direction of the arrow 20, a point is reached when the pick-off lever 17' will contact the underside of the hook 15. With continued movement downward of the tensioning lever 10 the hook 15 snaps away from the tensioning lever 10 and releases the safety belt 16.

Figure 2:
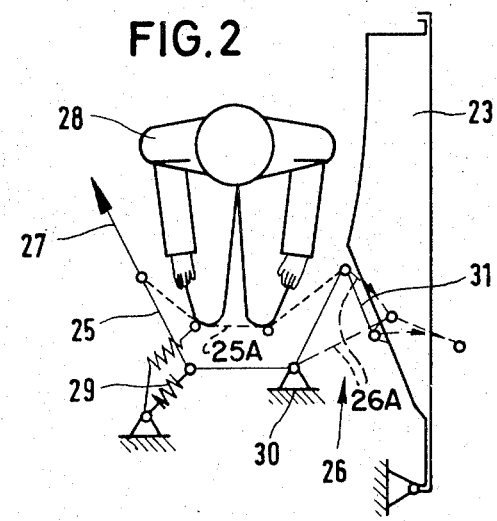
FIG. 2 is a schematic top plan view of the safety belt arrangement of the present invention designed as a knee belt.

FIG. 2 illustrates a safety belt used as a knee belt designated generally by the reference numeral 25. An arrow 27 is generally indicated in FIGS. 2 through 5 as the location of the abovedescribed tensioning device shown in FIGS. 1, 1a and 1b. The knee belt 25 is connected to the tensioning device 27 and held away from an occupant 28 by a spring 29. In this manner, the knee belt 25 does not contact the occupant except during collision. During normal driving conditions, the knee belt does not impede the free movement of the occupant 28.

The knee belt 25 is also connected to a releasing hinge 30 which changes the direction of the knee belt 25, upwardly in FIG. 1, where it is connected to a spacer arrangement generally referenced by the numeral 26. The purpose of the spacer arrangement 26 is to provide a means of allowing free egress from the vehicle when a door 23 is opened. The knee belt 25 is connected to an end of a lever 31 that is positioned generally adjacent and parallel to the door 23. The end of the lever 31 closest to the hinge of the door 23 is pivotally connected to a bearing assembly that is affixed to the door 23. By means of spring action, the lever 31 is held against the door 23 and held in that position by a lock (not shown) which may be coupled to a door lock when the door is closed. As the door lock is unlocked or as the door 23 is opened, the lever 31 is released from its stationary position, and lever 31 moves with the door to a position indicated in dotted lines 26A. Thus, the knee belt 25 is positioned out of the way of the occupant. When the door is closed and the tensioning device 27 is activated by a collision, the safety belt is pulled from the releasing hinge 30 and the spring is expanded so that the belt tightens about the knees of the passenger as indicated by dot-dash line 25A.

Figure 5:
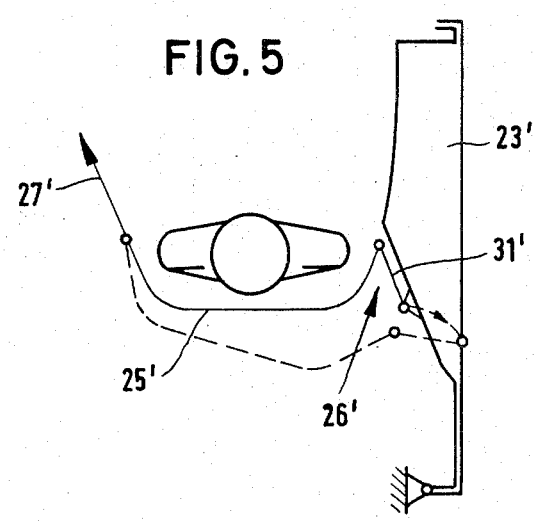
FIG. 5 is a top plan view in generally schematic form of a safety belt used as a body belt.

FIG. 5 illustrates an arrangement similar to the one shown in FIG. 2 except that the safety belt is used as a body belt 25'. The elements in FIG. 5 correspond to similarly referenced elements of FIG. 2 and perform the same functions, except that the releasing hinge and spring are not shown.

Figure 3:
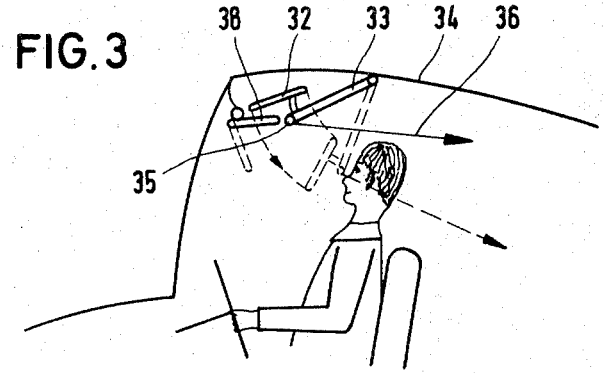
FIG. 3 is a schematic diagram of the safety belt arrangement of the present invention designed as a head harness.
Figure 4:
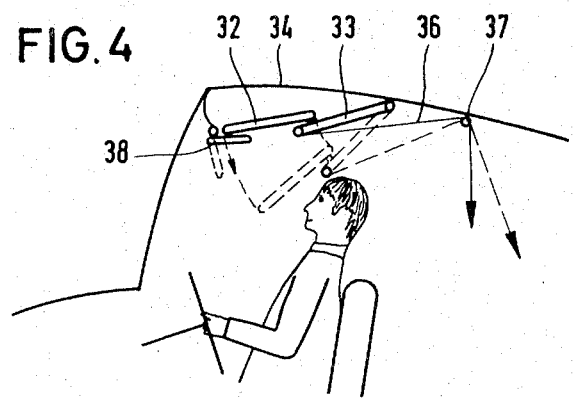
FIG. 4 is a schematic diagram of a modified safety belt arrangement used as a head harness.

In the embodiments shown in FIGS. 3 and 4 the safety belt is designed as a head harness 32 which may be made of a material that is transparent or perforated. The head harness 32 may also be made a part of a sun visor 38. A lever 33 pivotally connected at its upper end to the roof of the vehicle is connected near a lower end 35 to the head harness 32. The end 35 also has connected to it a line 36 that is connected to the tensioning device of the present invention (not shown), which may be also affixed to the roof of the vehicle. When a collision occurs, the line 36 is tensioned and pulls the head harness 32 down into the position shown by the dotted lines. Before the head harness 32 is tensioned, it may be positioned between the top of the vehicle and a sun visor 38.

FIG. 4 illustrates an alternative embodiment of the head harness 32 illustrated in FIG. 3. The tensioning device 27 may be located on the floor of the vehicle. As the tensioning device 27 is activated upon impact, a pulley 37 translates a downward movement into a horizontal movement along the line 36.

The embodiments of the safety device described above are intended to be merely exemplary and those skilled in the art will be able to make numerous variations in this without departing from the spirit and scope of the invention. All such variations and modifications are intended to be included within the scope of the invention as defined in the appended claims.

I claim:

1. In a safety belt tensioning apparatus for holding the occupant of a vehicle securely in position in the event of a collision, the improvement comprising a displaceable lever means, one end of which is releasably coupled to the safety belt and the other end is pivotally coupled to the vehicle, means for maintaining the displaceable lever means a fixed distance from the occupant to thereby maintain a fixed tension on the safety belt and a displaceable pressure responsive means coupled to the displaceable lever means and adapted to respond to contact pressure resulting from a collision for increasing the displacement between the displaceable lever means and the occupant to thereby tension the safety belt around the occupant.

2. A safety belt tensioning apparatus according to claim 1 wherein the maintaining means returns the displaceable lever means to its fixed distance from the occupant following its displacement by the displaceable pressure responsive means and further comprising release means adapted to engage the releasably coupled safety belt on its return from its displacement position and release the safety belt from the displacement lever means.

3. A safety belt tensioning apparatus according to claim 2 wherein the displaceable pressure responsive means comprises a fluid containing cylinder, a piston reciprocally mounted within the cylinder, the piston including a forward end surface adapted to extend beyond the external surface of the vehicle and a coupling means responsive to the flow of fluid under pressure within the cylinder caused by the rearward displacement of the piston within the cylinder upon impact for exerting the pressure against the displaceable lever means and displacing the lever means from its fixed position.

4. A safety belt tensioning apparatus according to claim 3, wherein the coupling means comprises a second cylinder receiving the fluid under pressure, a piston reciprocally mounted within the cylinder and responsive to the flow of fluid within the cylinder and a fixed arm connecting the piston and the displaceable lever means for imparting motion to the displaceable lever means.

5. A safety belt tensioning apparatus according to claim 4 wherein the coupling means further comprises a conduit for passing the fluid under pressure from the cylinder to the second cylinder of the coupling means and at least one check valve within the conduit for preventing the fluid from passing from the second cylinder of the coupling means to the cylinder of the displaceable pressure responsive means.

6. A safety belt tensioning apparatus according to claim 3 wherein the maintaining means comprises a throttling means connected to the cylinder of the displacement pressure responsive means for providing a controlled release of excessive fluid pressure to allow the displaceable lever means to return to the original position.

7. A safety belt tensioning apparatus according to claim 2 wherein the displaceable lever means comprises a pivotal lever having two arms, the end of one arm being releasably coupled to the safety belt and the end of the other arm being coupled to the vehicle at its pivot point, and means for coupling the displaceable pressure responsive means to the other arm of the lever and a hook releasably connected to the end of one arm of the lever and secured to the safety-belt.

8. A safety belt tensioning apparatus according to claim 7 wherein the maintaining means comprises a spring connecting the other arm of the lever and the vehicle near the pivot point of the end of the lever, the spring providing a restraining force on the lever arm when the lever rotates to limit the tension of the safety belt around the occupant.

9. A safety belt according to claim 7 wherein the release means comprises a pick-off lever, having one end connected to the lever arm near the recess, the pick-off lever being adjacent and parallel to the safety belt and the hook to serve as a guard to prevent premature release of the safety belt, a pick-off cam positioned adjacent the pick-off lever, the pick-off cam being prevented from contacting the safety belt by the pick-off lever, the pick-off lever sliding away from the pick-off cam when the lever arm is tensioned so as to expose the hook to the pick-off cam during the return motion of the displaceable lever means to release the safety belt and a cam positioned adjacent the pick-off cam at a distance at least the width of the pick-off lever to provide a stop for the pick-off lever to cause the pick-off lever to be positioned between the pick-off cam and the cam during the return motion of the lever arm.

10. A safety belt tensioning apparatus according to claim 7 wherein the release means comprises a pick-off lever and at least one cam positioned near the safety belt coupling end of the displaceable lever means for engaging the hook during the return movement of said lever to release the hook from the tensioning lever.

11. The safety belt tensioning apparatus according to claim 2 wherein the safety belt comprises a pivotal head harness positioned on the interior roof of the vehicle responsive to the displacement of the lever means away from the occupant for pivoting into a position in front of the occupant's head.

12. The safety belt tensioning apparatus according to claim 11 wherein the head harness is made of transparent material.

13. The safety belt tensioning apparatus according to claim 11 wherein said head harness engages the sun visor of the vehicle and rotates the visor downwardly when pivoted downwardly by the lever means.

14. The safety belt tensioning apparatus according to claim 2 wherein said safety belt is a knee belt comprising a spring connected to the frame of the vehicle and the knee belt for holding the knee belt away from said occupant and means operably connected to one end of the knee belt and to the door of the vehicle and responsive to the opening of the door to provide unobstructed entry from the vehicle.

15. The safety belt tensioning apparatus according to claim 14 wherein the means for providing unobstructed entry and exit comprises a lever positioned generally parallel and adjacent to the door, the lever being pivotally connected to said door on an end closest to the hinge of the door and being connected to the end of said knee belt at another end of the lever.

16. The safety belt tensioning apparatus according to claim 2 wherein said safety belt is a body belt.

* * * * *

PO-1050
(5/69)

UNITED STATES PATENT OFFICE
CERTIFICATE OF CORRECTION

Patent No. 3,804,430          Dated April 16, 1974

Inventor(s) Ernst Fiala et al

It is certified that error appears in the above-identified patent and that said Letters Patent are hereby corrected as shown below:

<u>First page, Item [75]</u>, "Inventor: Ernst Fiala, Margaretenhoehe, Austria" should read --Inventors: Ernst Fiala, Braunschweig-Querum; Gustav Vogelsang, Braunschweig, both of West Germany.--;

<u>First page, Item [73]</u>, "Germany" should be --West Germany--; and

<u>Col. 3, line 60</u>, "level" should read --lever--.

*Signed and Sealed this*

Twenty-first *Day of* December 1976

[SEAL]

Attest:

RUTH C. MASON          C. MARSHALL DANN
*Attesting Officer*          *Commissioner of Patents and Trademarks*